(12) United States Patent
Ahn

(10) Patent No.: US 7,142,265 B2
(45) Date of Patent: Nov. 28, 2006

(54) DISPLAY APPARATUS FOR A PORTABLE ELECTRONIC DEVICE

(75) Inventor: Kyoung-jin Ahn, Suwon (KR)

(73) Assignee: Samsung Electronics Co., Ltd. (KR)

( * ) Notice: Subject to any disclaimer, the term of this patent is extended or adjusted under 35 U.S.C. 154(b) by 175 days.

(21) Appl. No.: 10/829,327

(22) Filed: Apr. 22, 2004

(65) Prior Publication Data

US 2004/0246399 A1 Dec. 9, 2004

(30) Foreign Application Priority Data

Apr. 28, 2003 (KR) ...................... 10-2003-0026799

(51) Int. Cl.
*G02F 1/1333* (2006.01)
(52) U.S. Cl. ..................................... 349/58
(58) Field of Classification Search ............ 349/58–60; 361/600
See application file for complete search history.

(56) References Cited

U.S. PATENT DOCUMENTS

2003/0227581 A1* 12/2003 Sung et al. ................... 349/58
2005/0078389 A1* 4/2005 Kulas et al. ................ 359/871

\* cited by examiner

*Primary Examiner*—Dung T. Nguyen
(74) *Attorney, Agent, or Firm*—Roylance, Abrams, Berdo & Goodman, L.L.P.

(57) ABSTRACT

Disclosed is a display for a portable electronic apparatus including a first and second casings enclosing an outer circumference of a display unit, at least one first hole penetrating the outer circumference of the first casing, at least one fastening projection protruding from an inner wall of the second casing, and having at least a fastening hole corresponding to the first hole, and at least one screw having a screw part which is screw-coupled with the fastening hole by penetrating the fist hole.

23 Claims, 7 Drawing Sheets

DISPLAY APPARATUS FOR A PORTABLE ELECTRONIC DEVICE

CROSS-REFERENCE TO RELATED APPLICATION

This application claims the benefit of Korean Application No. 2003-26799, filed Apr. 28, 2003, in the Korean Intellectual Property Office, the disclosure of which is incorporated herein by reference.

BACKGROUND OF THE INVENTION

1. Field of the Invention

The present invention relates to a display, and more particularly, to a display which is pivotally mounted in a portable electronic device.

2. Description of the Related Art

In general, portable electronic devices such as a mobile phone, a camcorder, a digital still camera, a Personal Digital Assistant (PDA), a laptop, and a portable sound player, which are playable while being carried by a user, include a display for displaying a visible image selected by the user, or information on the operation of the portable electronic devices.

FIG. 1 shows an example of a portable electronic device, i.e., a multi-function camera 100 for performing the functions of a camcorder and a digital still camera. Referring to FIG. 1, a display 120 is pivotally mounted on one side of a portable device body 110 via a hinge unit 130, allowing a user to conveniently watch an image displayed by the display 120 without being limited by the position of the portable device body 110.

FIGS. 2 and 3 illustrate components of the display 120. Referring to FIGS. 2 and 3, the display 120 comprises a display unit 123, a control board 124, a first casing 121, and a second casing 127.

The first and the second casings 121, 127 are generally formed by synthetic resin mould and are screw-coupled to each other by at least one screw S and one nut member 129. The screw S penetrates first and second holes 121a, 127a which are formed respectively in the first and the second casings 121, 127. The nut member 129 is mounted in a fastening projection 128 protruding from an inner wall of the first casing 121.

Parts of the above-structured conventional display 120 are preferably minimized in size except for the display unit 123, which is preferably formed having a predetermined size for displaying an image for a compact-sized portable electronic device 100.

However, it is difficult for the conventional display 120 to be compactly formed since the first casing 121 should be larger than the display unit 123 by an interval 'a' which is the thickness of the fastening projection 128. Further, when the first casing 121 is made by the synthetic resin mould, a manufacturing process becomes complicated since a separate nut member 129 having a fastening hole 129a is required to be mounted in a fastening projection 128 in order to strengthen the screw-coupling of the screw S.

FIG. 4 is an exploded perspective view showing a structure of another conventional display 220. Referring to FIG. 4, first and second casings 221, 227 are connected to each other by the fitting of a connection protrusion 221a and a connection hole 227a. Therefore, the size of the first casing 221 can be reduced corresponding to the size of the display unit 123. However, this embodiment usually results in a gap between the first and the second casings 221, 227 due to an external force exerted when the display 220 is rotated. In this case, foreign substances may enter the display 220. Also, the durability of the display 220 is deteriorated when the connection protrusion 221a or the connection hole 227a is broken by the external force.

SUMMARY

The present invention has been made to overcome the above-mentioned problems of the prior art. Accordingly, an aspect of the present invention provides a display of a portable electronic device, of which a casing enclosing a display unit is minimized in size for compactness of the device.

In order to substantially accomplish the above-described aspects of the present invention, there is provided a display comprising a display unit having a display panel; a first casing covering a front side of the display unit including an exposed display panel, and having a window for showing an effective image area of the display panel, and a second casing connected with the first casing by a predetermined connection means so as to cover a rear side of the display unit. The connection means comprising at least one first hole penetrating an outer frame of the first casing, at least one fastening projection protruding from an inner wall of the second casing toward the display unit, and having a fastening hole corresponding to the at least one first hole, and at least one fastening member having a screw part which is screw-coupled with the fastening hole by penetrating the first hole.

It is preferable that the first hole is formed at an end of the outer frame of the first casing/ The second casing comprises an outer frame which faces the fastening projection with the first hole positioned therebetween, when the first and the second casings are connected, and the outer frame of the second casing has a second hole facing the first hole.

Accordingly, due to the fastening projection protruding from the inner wall of the second casing, the size of the first casing is reduced, therefore providing a compact-sized display.

According to an embodiment of the present invention, it is preferable that an interval is provided between an inner wall of the first casing opposing the front side of the display unit and an end of the fastening projection with a thickness not less than a thickness of the display unit, and more preferable that a rear side of the display unit is supported by a contact with a free end of the fastening projection.

It is preferable that a control board is formed between the display unit and the second casing to control a movement of the display unit, and the control board comprises at least one notch unit which is cut in a predetermined shape to receive the screw part of the fastening member and the fastening projections.

It is preferable that the first and the second casings are connected so that the outer frames thereof form a plane.

Meanwhile, it is preferable that the display unit is pivotally mounted at one side of the portable device body by the hinge unit, and the hinge unit connects the portable device body and the control board for mutual signal transmission.

It is preferable that a part of the hinge unit is fixed to an outside of the first and/or the second casings, and all sides of the display unit are supported by the inner wall of the outer frame of the first casing.

Alternatively, it is also preferable that a part of the hinge unit is fixed inside the first and the second casings, penetrating a connection hole formed at one side of the first and/or the second casings, and all sides of the display unit are supported by the contact with inner wall of the outer frame of the first casing except one side which opposes the hinge unit.

It is more preferable that the first casing further comprises at least one block piece protruding from the inner wall to support the display unit by contact and prevent the display unit from inclining to the hinge unit.

On the other hand, it is still preferable that the second casing and the fastening projection are integrally formed with each other, and made by metal molding with the metal having a predetermined hardness.

The first hole is formed at an end of the outer frame of the first casing. The second casing comprises an outer frame which faces the fastening projection with the first hole positioned therebetween, when the first and the second casings are connected, and the outer frame of the second casing has a second hole facing the first hole.

A center of the fastening projection, which faces the second hole and has a fastening hole, is protruded a predetermined length toward the second hole.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
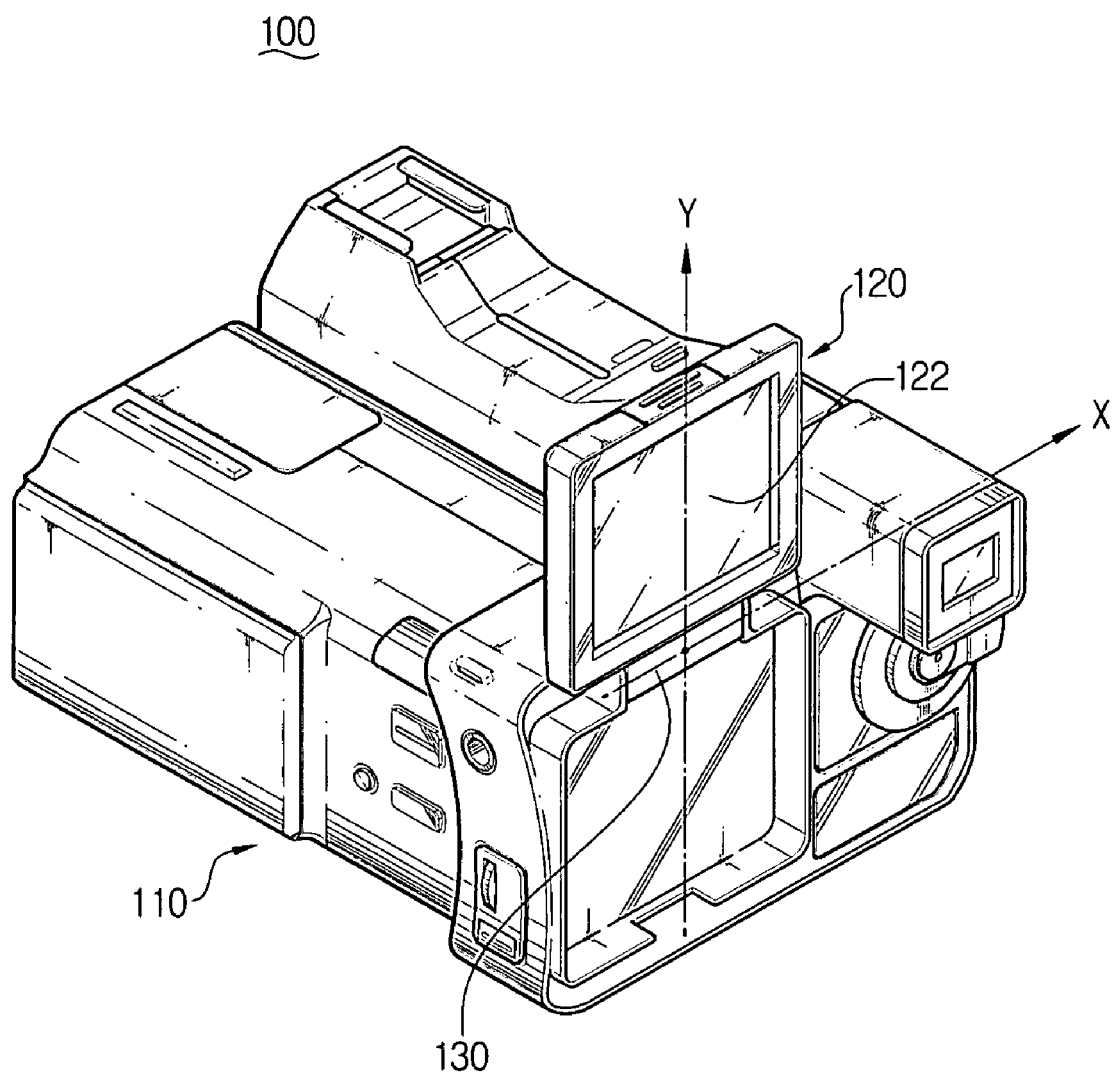
FIG. 1 is a perspective view of an exemplary conventional portable electronic device.
Figure 2:
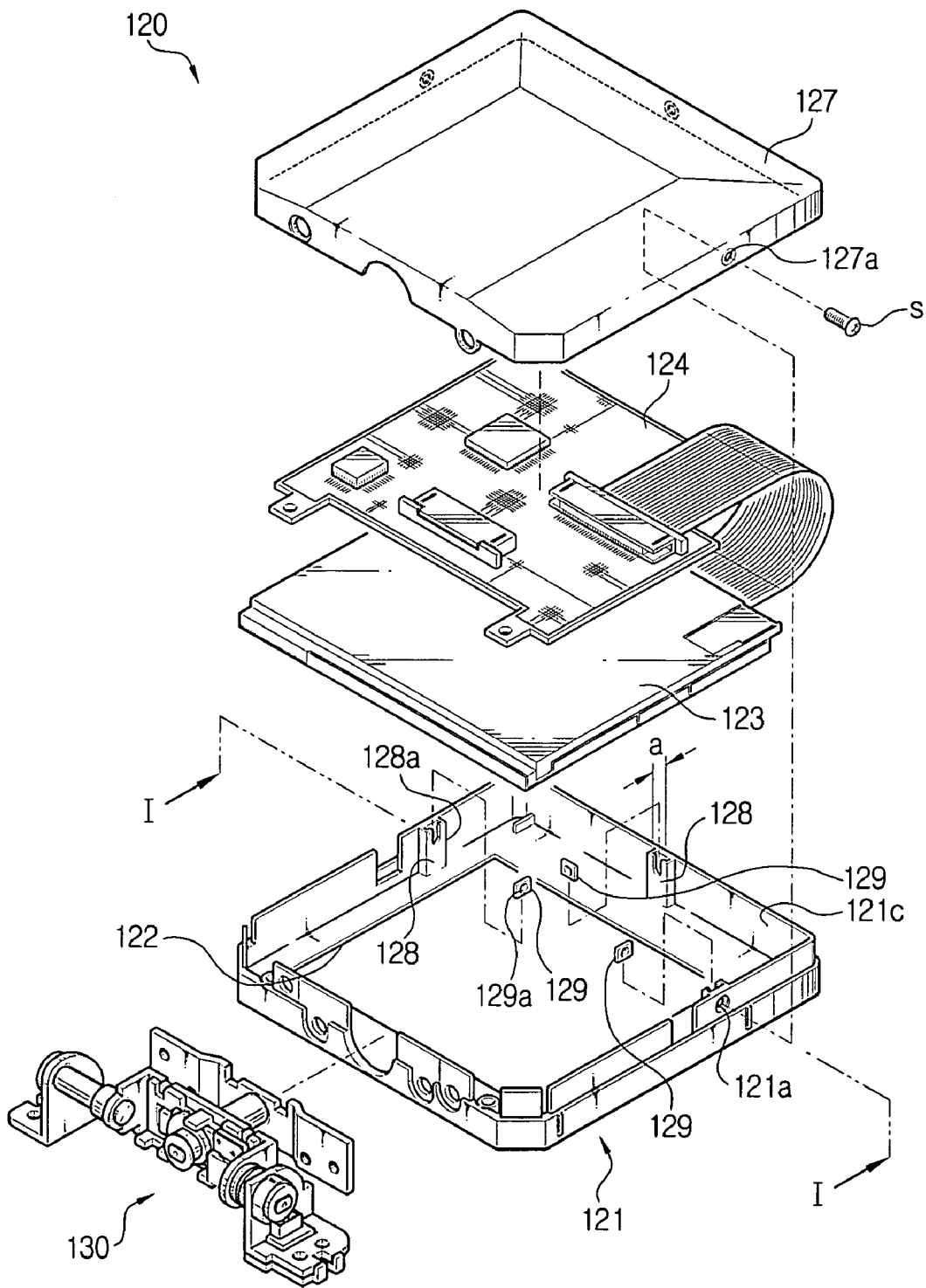
FIG. 2 is an exploded perspective view showing a structure of a conventional display.
Figure 3:
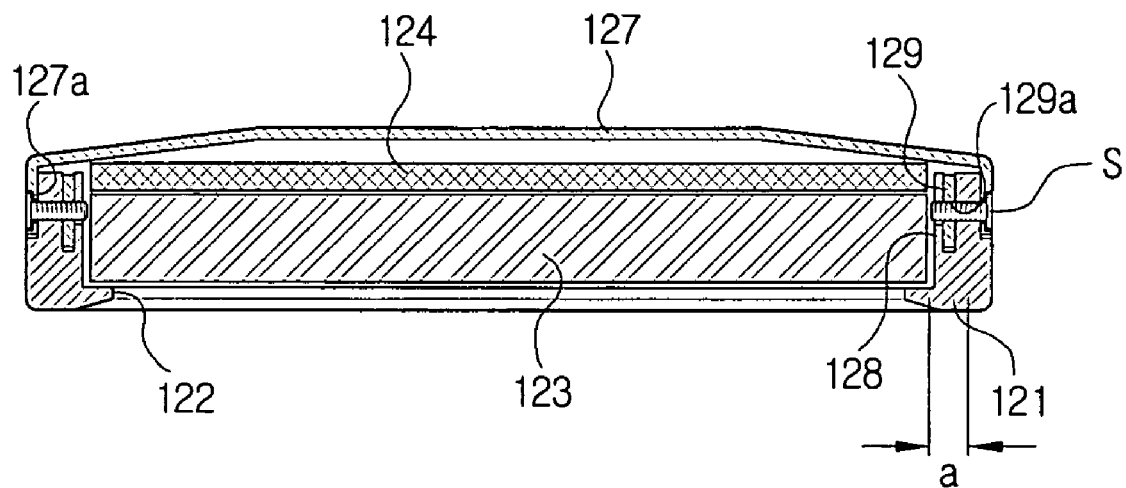
FIG. 3 is a sectional view of the assembled conventional display, cut along line I—I of FIG. 2.
Figure 4:
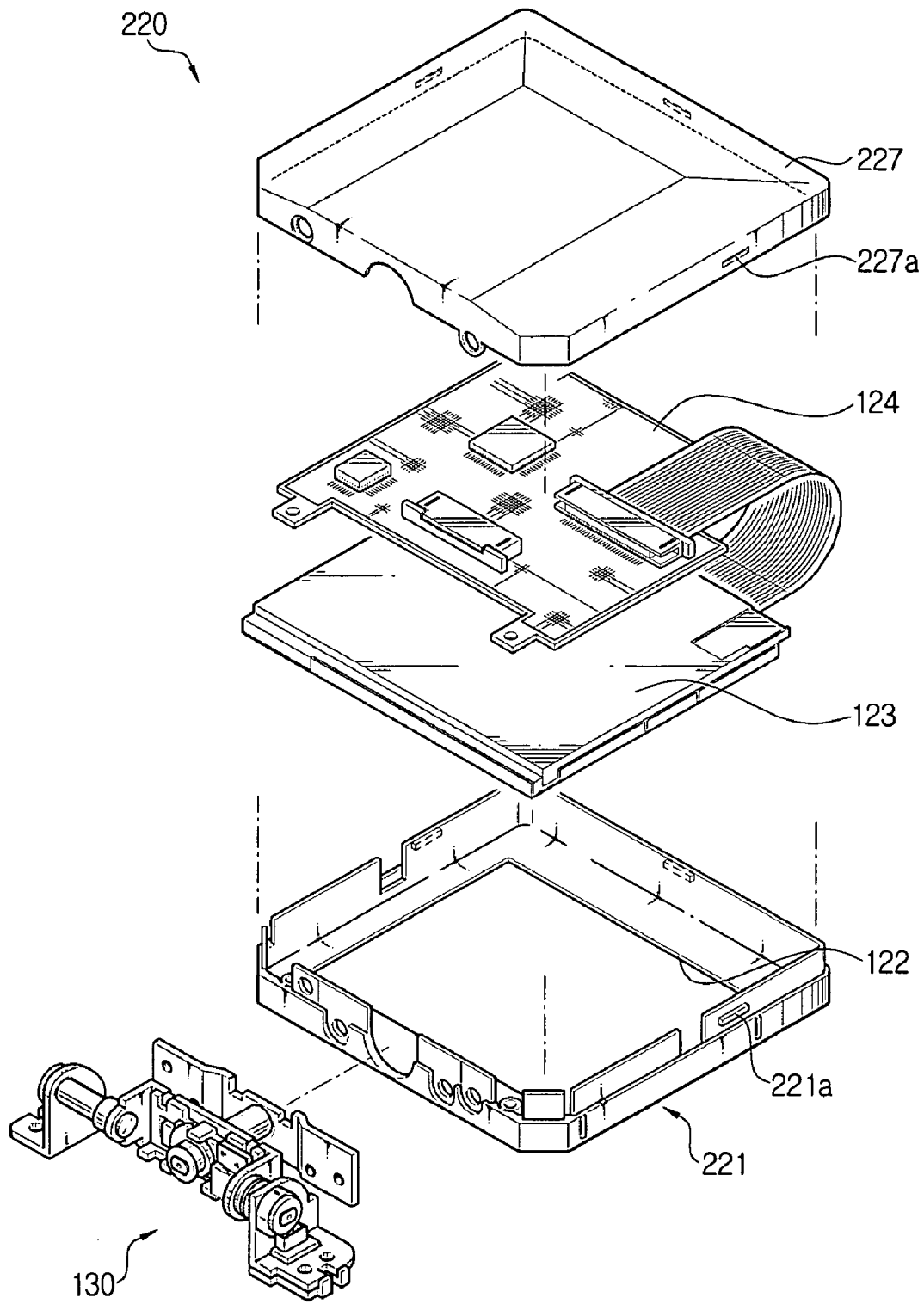
FIG. 4 is an exploded perspective view showing a structure of another conventional display.

Several embodiments of a display according to an embodiment of the present invention will be described in detail with reference to the accompanying drawings. Further, in referring to the elements having the same structure and function as those of a portable electronic device of FIGS. 1 to 4, the elements will be cited by the same reference numerals.

Referring to FIGS. 5 to 9, a display 320 according to an embodiment of the present invention comprises a display unit 123, a control board 124, a first casing 321 and second casing 327.

The display unit 123 includes a display panel (not shown) for displaying a visible image controlled by the control board 124. For the display panel, a liquid crystal display (LCD) is preferred.

The first casing 321 covers a front side of the display unit 123 except for an exposed display panel 123 thereof, and has a window 122 for showing an effective image area of the display panel in which an image is displayed. On the other hand, the second casing 327 is connected to the first casing 321 by a predetermined connection means, and therefore, covers a rear side of the display unit 123, specifically, the control board 124.

The connection means according to an embodiment of the present invention comprises a first hole 321a, a second hole 327a, a fastening projection 328, and a fastening member 329. Any member can be employed for the fastening member 329 as long as it has a screw part 329a capable of coupling the first and the second casings 321, 327, via screw-coupling with a fastening hole 328a of the fastening projection 328 such as a bolt and a screw, which will be described later in detail.

Figure 5:
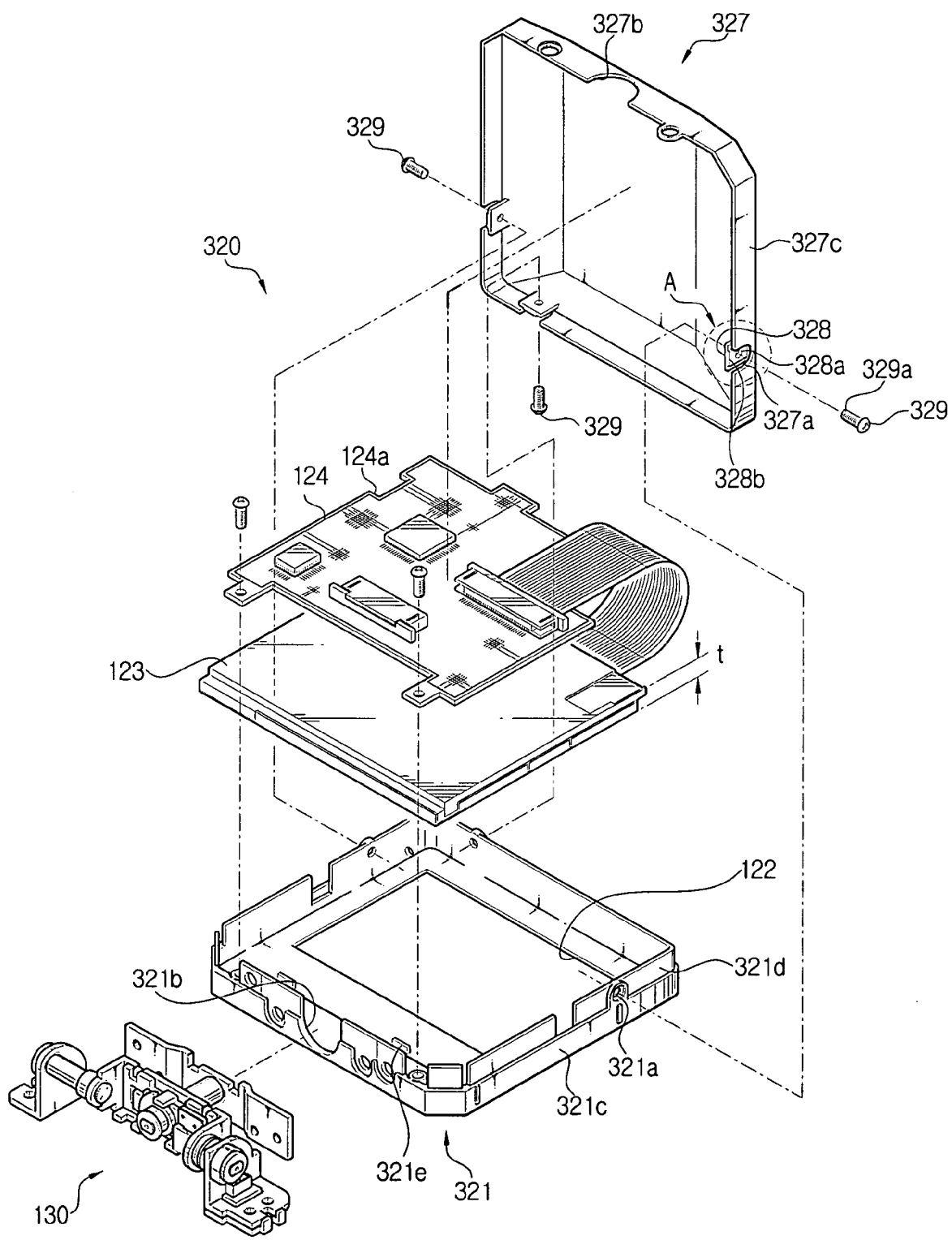
FIG. 5 is an exploded perspective view of a connecting structure of a display in accordance with an embodiment of the present invention.
Figure 6:
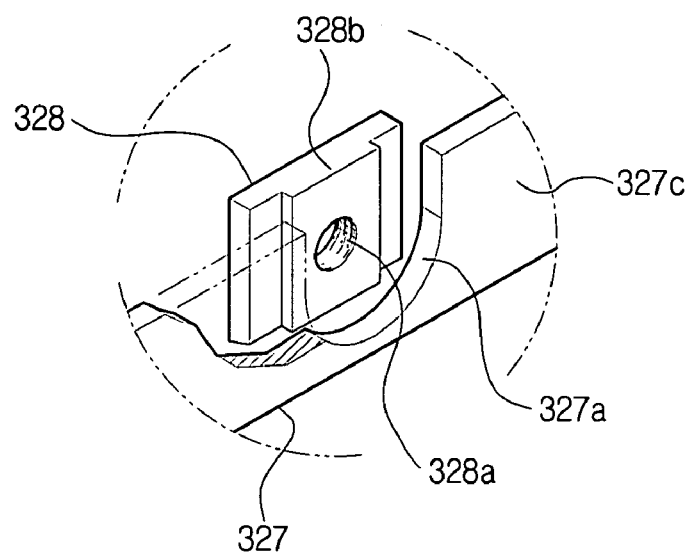
FIG. 6 is an enlarged perspective view of circle A of FIG. 5 in accordance with an embodiment of the present invention.
Figure 7:
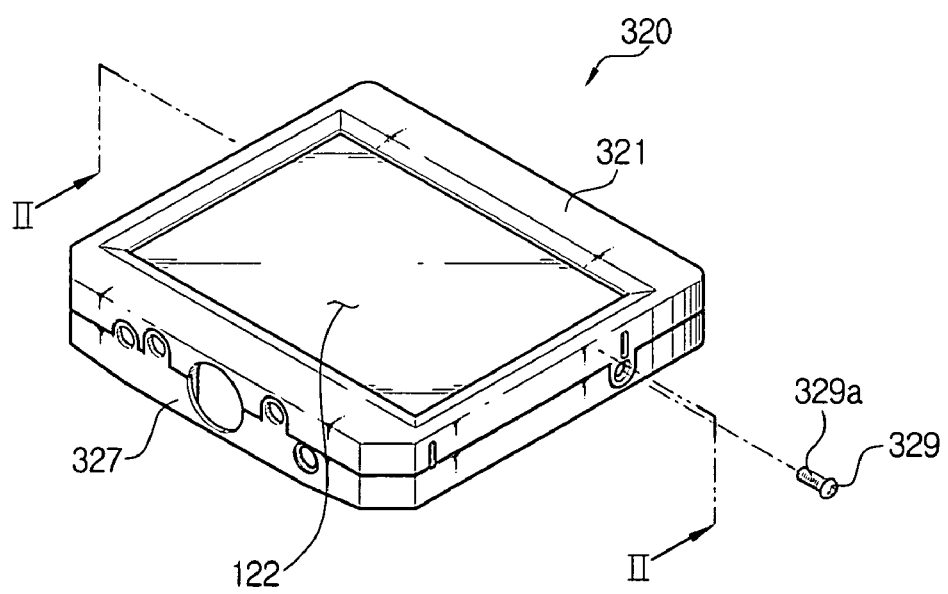
FIG. 7 is a perspective view of the assembled display in accordance with an embodiment of the present invention.

The first hole 321a is formed in an outer frame 321c of the first casing 321. The second hole 327a is formed in an outer frame 327c of the second casing 327 corresponding to the first hole 321a. Various types of first and the second holes 321a, 327a can be used as long as they can connect the first and the second casings 321, 327, by screw-coupling of the screw part 329a of the connection member 329 and the fastening projection 328 which will be described later. By way of an example, as shown in FIG. 5, for connecting the first and the second casings 321, 327, the second hole 327a may be formed as a groove to receive a part of the first casing 321 in which the first hole 321a is formed. In this manner, the frames 321c, 327c of the first and the second casings 321, 327, which are disposed on outer edges of casings 321, 327 form a plane when connecting the first and the second casings 321, 327. Likewise, various connecting structures are acceptable as substitutes.

The fastening projection 328 protrudes from an inner wall of the second casing 327 toward the first casing 321, and has a fastening hole 328a for screw-coupling with the screw part 329a of the fastening member 329 when the casings 321, 327 are connected. The fastening hole 328a is formed in the fastening projection 328 corresponding to the first and the second holes 321a, 327a. It is preferable that the fastening projection 328 is distanced by a predetermined interval 'b' (see FIG. 8) from the inner wall of the frame 327c of the second casing 327. It is more preferable that an interval 'c' (see FIG. 8) between an inner wall of the first casing 321 and an end of the fastening projection 328, is the same as a thickness 't' (see FIG. 5) of the display unit 123. In this embodiment of the present invention, when the thickness 't' of the display unit 123 is the same as the interval 'c' between the inner wall of the first casing 321 and the end of the fastening projection 328, the rear side of the display unit 123 is supported in contact with the end of the fastening projection 328.

Accordingly, when connecting the first and the second casings 321, 327, the display unit 123 is disposed in a space between the fastening projection 328 and the inner wall of the first casing 321, and accordingly, the screw part 329a of the fastening member 329 is positioned between the display unit 123 and the second casing 327. Therefore, since no separate escape space 'a' (see FIG. 2) is necessary for the screw part 329a of the fastening member 329, an inner side of the first casing 321 can be the same size as an outer frame of the display unit 123.

In this case, a plurality of notch units 124a (see FIG. 5) are formed on the control board 124 which is relatively easier to provide than for the display unit 123 to be made smaller, to receive the screw part 329a of the fastening member 329, and the end of the fastening projection 328. The notch units 124a preferably substitute for the conventional escape space 'a' (see FIG. 2). Therefore, the display 320 can have a narrower width.

It is preferable that the fastening projection 328 is integrally formed with the second casing 327 to simplify the manufacturing process of the second casing 327. In order to integrate the second casing 327 and the fastening projection 328, various manufacturing methods are applicable. The fastening projection 328 is formed thin in this embodiment of the present invention. However, the fastening projection 328 is integrally formed during the casting of the second casing 327 by a metal, as a single body, to provide sufficient hardness to prevent breakage while the fastening member 329 and the fastening holes 328 are screw-coupled with each other. Additionally, according to an embodiment of the present invention, the second casing 327 is preferably formed of a light metal such as a magnesium, which is stronger than a synthetic resin and easy to shape.

Meanwhile, to reduce the size of the notch unit 124a of the control board 124, enough space for receiving the control board 124 is required inside the second casing 327. Accordingly, a distance 'd' between the fastening projections 328 needs to be maximized. To accomplish this, the fastening projection 328 is formed as thin as possible, but with a sufficient thickness so that a screw line (not shown) can be formed on an inner circumference of the fastening hole 328a having a minimum pitch for the screw-coupling with the screw part 329a of the fastening member 329. Additionally, the fastening projection 328 should be disposed as near as possible to the second hole 327a of the second casing 327. For the above two conditions, in this embodiment of the present invention, only a center 328b (FIG. 6) of one side of the fastening projection 328, which opposes the second hole 327a of the second casing 327, protrudes a predetermined length toward the second hole 327a. Because the fastening projection 328 is formed by a mould using a sliding core, it is hard to precisely form the fastening projection 328 together with the second casing 327 using only general molding due to a narrow space between the fastening projection 328 and the second hole 327a of the second casing 327. The forming method is a well-known one in molding, therefore, a detailed description thereof will be omitted. The shape of the fastening projection 328 is not limited to the described embodiments. One will understand various possible changes may be made such as the fastening projections 328 having uniform thickness.

Figure 8:
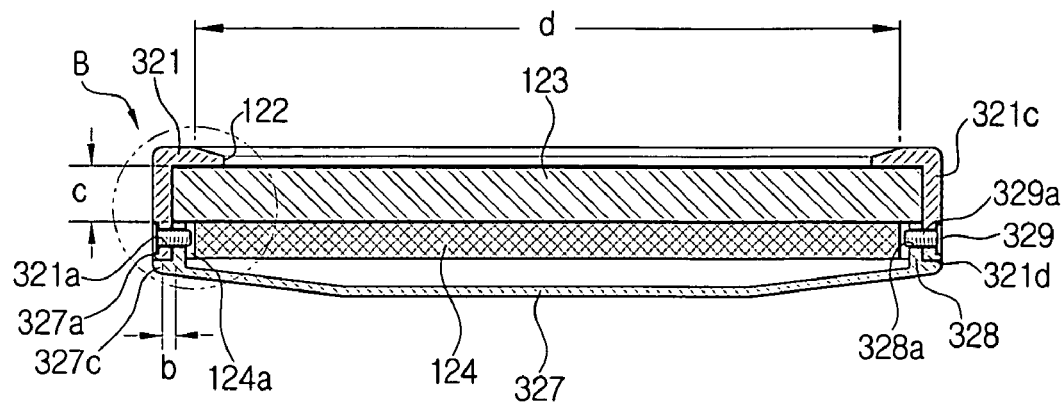
FIG. 8 is a sectional view showing an inner structure of the display, cut along line II—II of FIG. 7 in accordance with an embodiment of the present invention.
Figure 9:
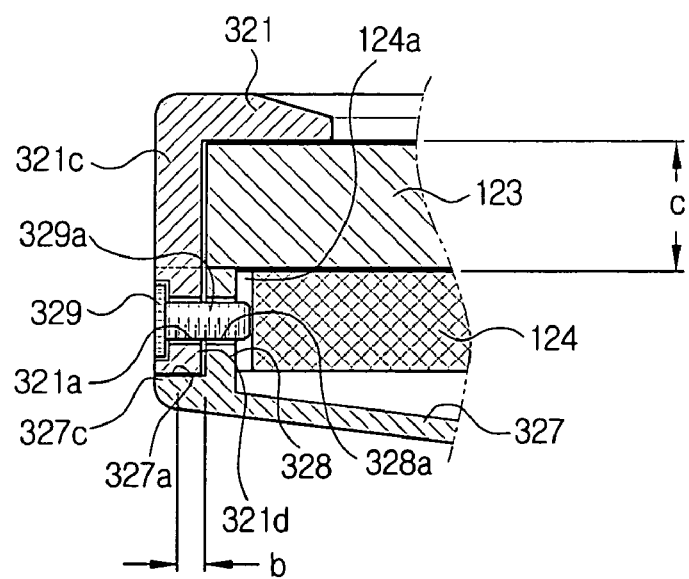
FIG. 9 is an enlarged sectional view of circle B of FIG. 8 in accordance with an embodiment of the present invention.

At a free end of the outer frame 321c of the first casing 321 is formed an insert unit 321d which is inserted between the fastening projection 328 and the outer frame 327c of the second casing 327 when the first and the second casings 321, 327 are connected with each other (see FIG. 8). It is preferable that the first hole 321a is formed in the insert unit 321d. Therefore, the interval 'b' between the fastening projection 328 and the opposing inner wall of the outer frame 327c of the second casing 327, is preferably the same as the thickness of the insert unit 327d.

Accordingly, when the first and the second casings 321, 327 are connected, the outer frames 321c, 327c thereof forms a plane, and therefore, the second casing 327 is prevented from being enlarged by the fastening projection 328.

The above-structured display 320 is connected to a portable device body 110 by a hinge unit 130 (see FIG. 1) and pivotable about at least one axis, and the control board 124 and the portable device body 110 are connected to each other for mutual signal transmission. The hinge unit 130 and the display 320 are usually connected to an outside portion of the display 320, or fixed to an inside portion of the display 320. Although not shown, when one side of the hinge unit 130 is fixed on the outside portion of the display 320, it becomes possible to form the first casing 321 so that the inner wall of the outer frame 321c of the first casing 321 can support all sides of the display unit 123 by contact, thereby enabling the first casing 321 to be smaller to correspond to the size of the display unit 123.

As shown in FIG. 5, when one side of the hinge unit 130 is fixed inside the display 320, connection holes 321b, 327b are aligned with each other on one side of the first and/or the second casings 321, 327. Therefore, the hinge unit 130 is attached to the first and the second casings 321, 327 by penetrating the connection holes 321b, 327b.

In this case, the display unit 123 is supported by contact on the inner wall of the outer frame 321c of the first casing 321, except one side that opposes the hinge unit 130. Accordingly, at least one block protrusion 321e is preferably formed on the first casing 321 to prevent the display unit 123 from moving toward the hinge unit 130.

Although the present invention has been described with respect to a display mounted in a multifunction camera for a camcorder and a digital still camera by way of an example, it is not limited to the disclosed embodiment. Therefore, one will understand that the present invention is applicable to all types of portable electronic devices having a pivotable display, such as a mobile phone and a PDA.

According to the embodiment of the present invention, the fastening projection 328 protrudes from the inner wall of the second casing 327 to restrict the size of the first casing 321. Therefore, a compact-sized display 320 can be realized.

While the invention has been shown and described with reference to certain embodiments thereof, it will be understood by those skilled in the art that various changes in form and details may be made therein without departing from the spirit and scope of the invention as defined by the appended claims.

What is claimed is:

1. A display comprising:
    a display unit having a display panel;
    a first casing covering a front side of the display unit including an exposed display panel, and having a window for showing an effective image area of the display panel; and
    a second casing connected with the first casing by a predetermined connection means so as to cover a rear side of the display unit,
    the connection means comprising:
        at least one first hole penetrating an outer frame of the first casing;
        at least one fastening projection protruding from an inner wall of the second casing toward the display unit, the at least one fastening projection being spaced apart from an outer frame of the second casing, and having a fastening hole corresponding to the at least one first hole; and
        at least one fastening member having a screw part which is screw-coupled with the fastening hole by penetrating the first hole.

2. The display of claim 1, wherein a spacing is provided between an inner wall of the first casing opposing the front side of the display unit and an end of the fastening projection, with a thickness not less than a thickness of the display unit.

3. The display of claim 2, wherein a rear side of the display unit is supported by a contact with a free end of the fastening projection.

4. The display of claim 3, wherein the display unit is pivotally mounted at one side of the portable device body by the hinge unit, and a hinge unit connects the portable device body and the control board for mutual signal transmission.

5. The display of claim 4, wherein a part of the hinge unit is fixed to an outside of at least one of the first and the second casings, and all sides of the display unit are supported by contact with the inner wall of the outer frame of the first casing.

6. The display of claim 4, wherein a part of the hinge unit is fixed inside the first and the second casings, penetrating a connection hole formed at one side of the first and/or the second casings, and all sides of the display unit are supported by contact with the inner wall of the outer frame of the first casing except one side which opposes the hinge unit.

7. The display of claim 6, wherein the first casing further comprises at least one block piece protruding from the inner wall to support the display unit by contact and prevent the display unit from inclining to the hinge unit.

8. The display of claim 2, wherein a control board is disposed between the display unit and the second casing to control the display unit to reproduce an image, and
the control board comprises at least one notch unit which is cut in a predetermined shape to receive the screw part of the fastening member and the fastening projections.

9. The display of claim 8, wherein
the first hole is formed at an end of the outer frame of the first casing,
the outer frame of the second casing faces the fastening projection,
the first hole is positioned between the outer frame of the second casing and the fastening projection, when the first and the second casings are connected, and
the outer frame of the second casing has a second hole facing the first hole.

10. The display of claim 9, wherein the first and the second casings are connected so that the outer frames thereof form a plane.

11. The display of claim 9, wherein the second hole of the second casing is structured having a groove to accept a portion of the first casing having the first hole.

12. The display of claim 1, wherein the second casing and the fastening projection are integrally formed with each other.

13. The display of claim 12, wherein the second casing and the fastening projection are made by metal molding with the metal having a predetermined hardness.

14. The display of claim 13, wherein
the first hole is formed at an end of the outer frame of the first casing,
the an outer frame of the second casing faces the fastening projection,
the first hole is positioned between the outer frame of the second casing and the fastening projection, when the first and the second casings are connected, and
the outer frame of the second casing has a second hole facing the first hole.

15. The display of claim 14, wherein a center portion of the fastening projection, which faces the second hole and has a fastening hole, protrudes a predetermined length toward the second hole.

16. The display of claim 1, wherein
the outer frame of the second casing comprises a second hole facing the first hole; and
the second hole of the second casing is structured having a groove to accept a portion of the first casing having the first hole.

17. A display having a display unit and a control board disposed between a first casing and a second casing, the display comprises:
at least one first hole disposed on at least one edge of said first casing;
at least one second hole disposed on at least one edge of said second casing;
at least one fastening projection protruding from an inner wall of the second casing toward the display unit, the at least one fastening projection being spaced apart from the at least one edge of said second casing, said fastening projection including a fastening hole corresponding to said first hole and said second hole; and
at least one notch unit located on at least one edge of said control board.

18. The display of claim 17, further comprising:
a fastening member for pivotally connecting the first casing and the second casing via said first hole, second hole and fastening hole.

19. The display of claim 17, wherein said fastening member comprises a screw.

20. The display of claim 17, wherein said fastening projection and said second casing are integrally formed.

21. The display of claim 20, wherein said fastening projection and said second casing are formed using metal molding.

22. The display of claim 17, wherein the at least one fastening projection fits within the at least one notch unit of the control board when the first casing and the second casing are in a closed state.

23. The display of claim 17, wherein
the second hole of the second casing is structured having a groove to accept a portion of the first casing having the first hole.

* * * * *